No. 719,088. PATENTED JAN. 27, 1903.
G. P. COATES.
POCKET IMPLEMENT.
APPLICATION FILED MAY 17, 1902.
NO MODEL.
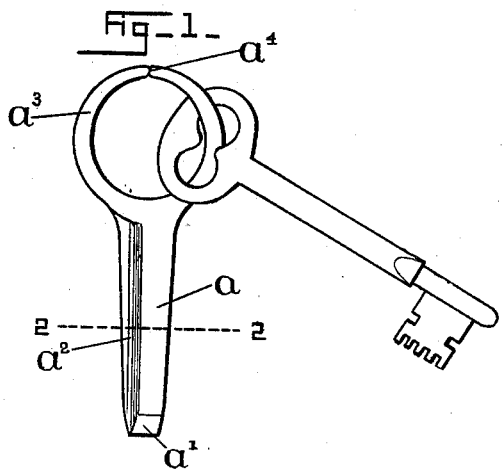
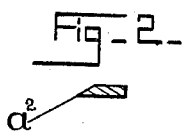
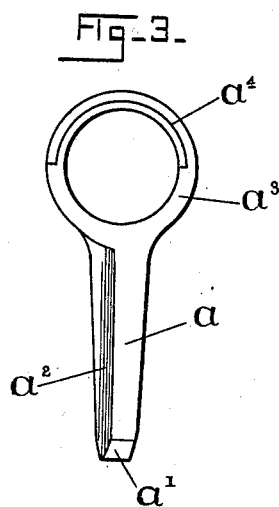
WITNESSES
INVENTOR,
Gilbert P. Coates,
BY HIS ATTORNEY,

UNITED STATES PATENT OFFICE.

GILBERT P. COATES, OF UNCASVILLE, CONNECTICUT.

POCKET IMPLEMENT.

SPECIFICATION forming part of Letters Patent No. 719,088, dated January 27, 1903.

Application filed May 17, 1902. Serial No. 107,736. (No model.)

*To all whom it may concern:*

Be it known that I, GILBERT P. COATES, a citizen of the United States, residing at Uncasville, in the county of New London and State of Connecticut, have invented certain new and useful Improvements in Pocket Implements, of which the following is a full, clear, and exact description.

The object of this invention is to provide in one integral piece of metal an implement that may serve the triple offices of key-ring, screw-driver, and letter-opener, the said implement being of such simple form that it may be readily punched from sheet-steel or the like stock.

In the accompanying drawings, Figure 1 is a view of my improved implement in its simplest form; and Fig. 2 is a cross-sectional view of the same, taken on line 2 2 of said Fig. 1. Fig. 3 is a view of an implement embodying my improvements, showing a slightly-different form of key-ring.

In the drawings the letter $a$ indicates the body or blade portion of my said implement, the same being of convenient length to be carried in a pocket and terminating at one end in a screw-driver point $a'$. One edge of said blade is preferably beveled, as at $a^2$, to provide a cutting edge that is sufficiently sharp to serve as a letter-opener. The opposite end of the implement is formed with an enlarged integral head portion $a^3$ of suitable shape to serve as a key-ring, (here shown as circular,) the said ring being cut through, substantially as at $a^4$, in such manner that the ring portion of a key may be interlooped with said ring, as seen in Fig. 1.

The particular shape of the key-retaining portion $a^3$ is not material, nor is the exact manner of splitting said ring to receive the key material, so long as the key-ring and screw-driver are formed of a single integral piece.

It will be obvious that the cutting edge $a^2$ could be dispensed with without in any degree impairing the usefulness of the combined screw-driver and key-ring.

My described implements may be very cheaply and rapidly produced by punching them from sheet metal, the flat side portions may be utilized as advertising media by imprinting any desired reading matter thereon, and the complete implement being carried in the pocket is always within convenient reach when needed.

Having described my invention, I claim—

In combination, in a pocket implement, an elongated body portion having one termination formed as a screw-driver and the opposite termination formed as a split ring, the said body portion being formed with a cutting edge, all substantially as specified.

Signed at Norwich, Connecticut, this 6th day of May, 1902.

GILBERT P. COATES.

Witnesses:
  FRANK H. ALLEN,
  FRANK S. DEWIRE.